United States Patent
Arai (10) Patent No.: US 10,469,707 B2
(45) Date of Patent: Nov. 5, 2019

(54) METHOD FOR MANUFACTURING A SCANNER PERFORMING SHADING CORRECTION

(71) Applicant: SEIKO EPSON CORPORATION, Tokyo (JP)

(72) Inventor: Kohei Arai, Fukuoka (JP)

(73) Assignee: Seiko Epson Corporation, Tokyo (JP)

( * ) Notice: Subject to any disclaimer, the term of this patent is extended or adjusted under 35 U.S.C. 154(b) by 3 days.

(21) Appl. No.: 15/859,913

(22) Filed: Jan. 2, 2018

(65) Prior Publication Data

US 2018/0213120 A1   Jul. 26, 2018

(30) Foreign Application Priority Data

Jan. 24, 2017   (JP) ................. 2017-010069

(51) Int. Cl.
| | |
|---|---|
| *H04N 1/40* | (2006.01) |
| *H04N 1/407* | (2006.01) |
| *H04N 1/401* | (2006.01) |
| *G06F 8/61* | (2018.01) |
| *G05B 19/402* | (2006.01) |
| *H04N 1/409* | (2006.01) |

(52) U.S. Cl.
CPC ......... *H04N 1/4078* (2013.01); *G05B 19/402* (2013.01); *G06F 8/61* (2013.01); *H04N 1/401* (2013.01); *H04N 1/409* (2013.01); *G05B 2219/37558* (2013.01); *H04N 2201/0081* (2013.01)

(58) Field of Classification Search
None
See application file for complete search history.

(56) References Cited

U.S. PATENT DOCUMENTS

| | | | | |
|---|---|---|---|---|
| 2002/0021456 | A1* | 2/2002 | Toriyama | H04N 1/401 358/446 |
| 2012/0224234 | A1* | 9/2012 | Suzuki | H04N 1/4076 358/448 |
| 2013/0293934 | A1 | 11/2013 | Shinto | |

FOREIGN PATENT DOCUMENTS

| | | |
|---|---|---|
| CN | 103391385 A | 11/2013 |
| JP | 2004-120599 A | 4/2004 |
| JP | 2004-282151 A | 10/2004 |

\* cited by examiner

*Primary Examiner* — Barbara D Reinier (57) ABSTRACT

A scanner includes a marked reference plate in which a mark is made on a reference plate, and a non-volatile memory that stores reference data, which is a result of the reference plate disposed facing an image reading sensor being read by the image reading sensor, in which read data is acquired a result of the marked reference plate being read by the image reading sensor, and shading data is calculated by comparing the read data and the reference data.

5 Claims, 7 Drawing Sheets

METHOD FOR MANUFACTURING A SCANNER PERFORMING SHADING CORRECTION

BACKGROUND

1. Technical Field

The present invention relates to a scanner that performs shading correction using shading data acquired by reading a marked reference plate, and a method for manufacturing the scanner.

2. Related Art

A scanner that transports a document along a transport pathway passing a reading position, and in which the document that passes through the reading position is optically read by a sensor is known. The sensor is provided with a plurality of light receiving elements arranged in a linear form in the width direction of the transport pathway and a plurality of lenses that guide reflected light of reading light radiated onto the document to each light receiving element. In a similar manner to the plurality of light receiving elements, the plurality of lenses are arranged in a linear form in the width direction of the transport pathway. The scanner acquires a read image of a document on the basis of outputs from the plurality of light receiving elements.

In the sensor, there are cases in which there is variation in the output from each light receiving element caused by variation in the amount of light transmitted by each lens and variation in the performance of each light receiving element. Therefore, the scanner carries out shading correction on an acquired read image, corrects variation in the luminosity, or the like, of pixels, which is caused by variation in the output from each light receiving element, and outputs a post-correction corrected image as a reading result. In the shading correction, prior to reading of a document, reference data is acquired as a result of a white reference plate disposed in a reading position being read by a sensor. Further, the reference data is used as shading data for performing shading correction of each pixel of a read image.

The scanner disclosed in JP-A-2004-282151 is provided with a cylindrical background plate roller in the reading position. The background plate roller is provided with a white region portion in a central portion in the width direction, and black region portions on both sides in the width direction of the white region. The width of the white region portion changes in the circumferential direction of the background plate roller. When reading a document, the width of the white region portion is matched with the width of the document by rotating the background plate roller in accordance with a document size. The scanner of JP-A-2004-282151 detects skew of a document on the basis of an overlapping state of a transported document and the black region portion at the reading position.

In a case in which, for example, a black mark is made in a section of the reference plate disposed in the reading position in the manner of the background plate roller of JP-A-2004-282151, there is a problem in that shading correction of image sections that correspond to the mark in a read image is not suitably performed when read data in which the reference plate (a marked reference plate) is read by the sensor is used as shading data.

SUMMARY

An advantage of some aspects of the invention is to provide a scanner that is capable of favorably performing shading correction even in a case in which a mark is made on the reference plate and a method for manufacturing the scanner.

According to an aspect of the invention, there is provided a scanner in which a transported document is read by a sensor, the scanner including a marked reference plate in which a mark is made on a reference plate, a storage section that stores reference data, which is a result of the reference plate disposed facing the sensor being read by the sensor, a calculation section that calculates shading data by comparing read data, which is a result of the marked reference plate disposed facing the sensor being read by the sensor, and the reference data, and a correction portion that performs shading correction of a read image of the document read by the sensor on the basis of the shading data.

The scanner is provided with a marked reference plate in which a mark is made on the reference plate, but rather than unchanged read data in which the marked reference plate is read by the sensor being used as shading data, shading data is calculated by comparing read data and reference data, which is a result of the reference plate being read by the sensor in a state before the mark is made. As a result of this, it is possible to configure the shading data of a position of the mark to be a value that is close to a value in a case in which a mark is not made. Accordingly, even in a case in which a mark is made on the reference plate, the correction portion can favorably perform shading correction of a read image.

In the scanner, it is preferable that the calculation section calculate the shading data of the position of the mark on the basis of the reference data of the position of the mark and the read data in the periphery of the position of the mark. If such a configuration is used, it is possible to configure the shading data of the position of the mark to be a value that is suitable for shading correction.

In the scanner, when a coordinate in a main scanning direction, which intersects a transport direction of the document, is defined as x, values of the coordinate x that specify a range over which the mark is formed in the main scanning direction are defined as A and B, the reference data in the coordinate x is defined as X(x), the read data at in coordinate x is defined as Y(x), the amount of shift of the reference data X(x) and the read data Y(x) in a phase in the main scanning direction is defined as δx, a coordinate at which the coordinate x is offset by the amount of shift δx is defined as x', post-offsetting read data in which the read data Y(x) is offset by the amount of shift δx is defined as Y(x'), a predetermined distance in the main scanning direction is defined as C, a predetermined width in the main scanning direction S is defined as Δx, and shading data in the coordinate x' is defined as Y, (x'), it is preferable that the calculation section calculate the shading data Y'(x) using formulae (1), (2), and (3) below.

$$Y(x')=Y(x+\delta x) \qquad (1)$$

$$Y'(x')=Y(x')(x<A \text{ or } x>B) \qquad (2)$$

$$Y'(x')=X(x)\times[\text{Average}\{Y(x'-C+\Delta x)\}+\text{Average}\{Y(x'+C+\Delta x)\}]/[\text{Average}\{X(x-C+\Delta x)\}+\text{Average}\{X(x+C+\Delta x)\}](A<x<B) \qquad (3)$$

Formula (1) is a formula for matching the phase of the read data and the phase of the reference data. That is, generally, in a plurality of lenses arranged in the main scanning direction in a sensor, there is variation in the amount of light transmitted to each lens. Accordingly, the read data Y(x) and the reference data X(x) include phases (lens period irregularities) that correspond to the period at which the plurality of lenses are disposed. Meanwhile, in the scanner, there are cases in which an adhesive with which the plurality of lenses and the marked reference plate are fixed expands or contracts due to the temperature of an installation location, or the like, and the relative position of the marked reference plate and the plurality of lenses changes from that at the time of manufacture. In addition, there are cases in which the relative position of the marked reference plate and the plurality of lenses changes from that at the time of manufacture due to vibrations generated during carriage or during installation of the scanner. As a result of such changes, when the reference data $X(x)$ is compared with the read data $Y(x)$, there are cases in which there is a deviation between the phase of the reference data $X(x)$, which is acquired during manufacture, and the phase of the read data $Y(x)$, which is acquired during use. In such an instance, in formula (1), the read data $Y(x)$ is offset by an amount corresponding to the amount of shift $\delta x$ of the phases of the reference data $X(x)$ and the read data $Y(x)$, and the phase of the post-offsetting read data $Y(x')$ and the phase of the reference data $X(x)$ are matched.

Formula (2) configures unchanged post-offsetting read data $Y(x')$ as the shading data $Y'(x')$ for regions other than the position of the mark (a range in the main scanning direction over which the mark is formed). Formula (3) is a formula for calculating the shading data $Y'(x')$ of the position of the mark. In formula (3), a ratio of an average value of the reference data $X(x)$ in a range of a predetermined width $\Delta x$, which is a position that is separated from the position of the mark by a predetermined distance C on one side and the other side in the main scanning direction, and an average value of the post-offsetting read data $Y(x')$ in a range of a predetermined width $\Delta x$, which is a position that is separated from the position of the mark by a predetermined distance C on the one side and the other side in the main scanning direction is calculated. Further, the calculated ratio is multiplied by the reference data $X(x)$ at the position of the mark, and the shading data $Y'(x')$ of the position of the mark is acquired. If the formulae (1), (2), and (3) are used, it is possible to configure the shading data to be a value that is suitable for shading correction.

In the scanner, it is preferable that the mark be provided in a central portion of the reference plate in a main scanning direction, which intersects a transport direction of the document. If such a configuration is used, when a document is transported to a reading position by the sensor, it is possible to cover the mark with the document. Accordingly, it is possible to acquire a front end and a trailing end of a document in a read image from the position at which the document covers the mark.

Next, according to another aspect of the invention, there is provided a method for manufacturing a scanner in which a transported document is read by a sensor, the method including storing reference data, which is a result of a reference plate for shading correction that is disposed facing the sensor being read by the sensor, in a storage section, and forming a marked reference plate by making a mark on the reference plate.

In this case, in the storing of reference data while manufacturing the scanner, the reference data, which is a result of the reference plate being read by the sensor in a state before a mark is made, is stored in the storage section. Accordingly, when the marked reference plate is read by the sensor and read data is acquired before reading a document, or the like, it is possible to calculate the shading data by comparing the reference data with the read data. As a result of this, it is possible to configure the shading data of the position of the mark to be a value that is close to a value in a case in which a mark is not made. Accordingly, even in a case in which a mark is made on the reference plate, it is possible to favorably perform shading correction.

In the method, it is preferable that, in the forming, the mark be provided in a central portion of the reference plate in a main scanning direction, which intersects a transport direction of the document. If such a configuration is used, when a document is transported to a reading position by the sensor, it is possible to cover the mark with the document. Accordingly, it is possible to acquire a front end and a trailing end of a document in a read image from the position at which the document covers the mark. In the method, it is preferable that installing a correction portion program that causes a controller to calculate shading data by comparing read data, which is a result of the marked reference plate being read by the sensor, and the reference data, and to perform shading correction on a read image of the document read by the sensor on the basis of the shading data be further included. The installing includes loading a nonvolatile storage medium on which the program is stored in the scanner, and includes storing the program on a nonvolatile storage medium in the scanner by communicating with a scanner in which a nonvolatile storage medium is installed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
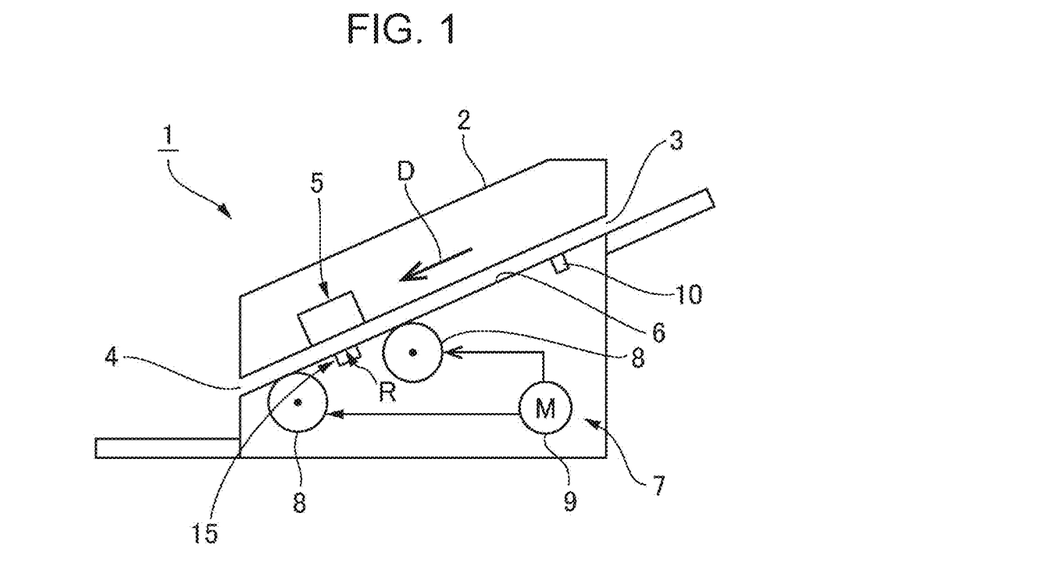
FIG. 1 is a schematic cross-sectional view of a scanner to which the invention is applied.
Figure 2:
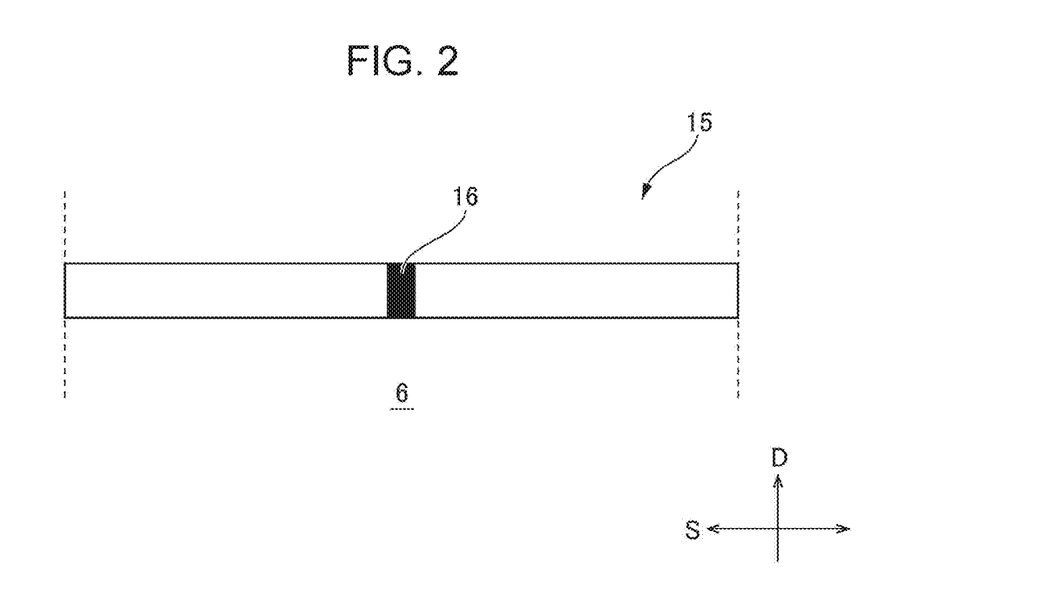
FIG. 2 is a plan view of a marked reference plate.

Hereinafter, a scanner, which is an embodiment of the invention, will be described with reference to the drawings. Overall Configuration FIG. 1 is a schematic cross-sectional view of a monochromic scanner to which the invention is applied. FIG. 2 is a plan view of a marked reference plate. A scanner 1 of the invention is provided with a case 2, a document insertion inlet 3, which is provided on the rear side of the case 2, and a document ejection outlet 4, which is provided on the front surface of the case 2. An image reading sensor 5 (sensor) for reading documents, a document transport pathway 6 that reaches from the insertion inlet 3 to the ejection outlet 4 passing a reading position R of the image reading sensor 5, and a transport mechanism 7 for transporting documents inserted into the insertion inlet 3 along the transport pathway 6 to the ejection outlet 4 are provided inside the case 2.

The image reading sensor 5 is disposed above the transport pathway 6 in a state in which a sensor surface is directed downward. The transport mechanism 7 is provided with transport rollers 8, and a transport motor 9 that functions as a drive source of the transport roller 8. The transport rollers 8 are disposed on the upstream side and the downstream side of the reading position R in a document transport direction D that runs toward the ejection outlet 4 from the insertion inlet 3. In addition, a paper detector 10 is disposed in the transport pathway 6, between the transport rollers 8 and the insertion inlet 3. The paper detector 10 optically or mechanically detects documents inserted into the transport pathway 6 from the insertion inlet 3.

The image reading sensor 5 of the present example is a contact image sensor (CIS) type sensor that uses a CMOS. The image reading sensor 5 is provided with a light source that radiates reading light toward the transport pathway 6, a plurality of light receiving elements that are arranged in a linear form in a main scanning direction S (the width direction of the transport pathway 6), which is orthogonal to the transport direction D, and a plurality of lenses that guide reflected light of the reading light from documents transported past the reading position R to each light receiving element. The plurality of lenses are arranged in a linear form in the main scanning direction S.

A marked reference plate 15 is disposed at the reading position R in a position that faces the sensor surface with the transport pathway 6 interposed therebetween. As shown in FIG. 2, the marked reference plate 15 is a rectangular plate that is elongated in the main scanning direction S, and is disposed in a state of traversing the transport pathway 6. In addition, the marked reference plate 15 is a reference plate in which the upper surface is flat and in which a black mark 16 has been made on a white reference plate 15A in a step for manufacturing the scanner 1. The mark 16 is formed in a central position (central position in the transport pathway 6) in the main scanning direction S. The black mark 16 extends in the transport direction D at a constant width. The color, shape, and position of the black mark 16 are not limited to this configuration. For example, a blue mark may be provided in the vicinity of one end portion in the main scanning direction.

Control System

Figure 3:
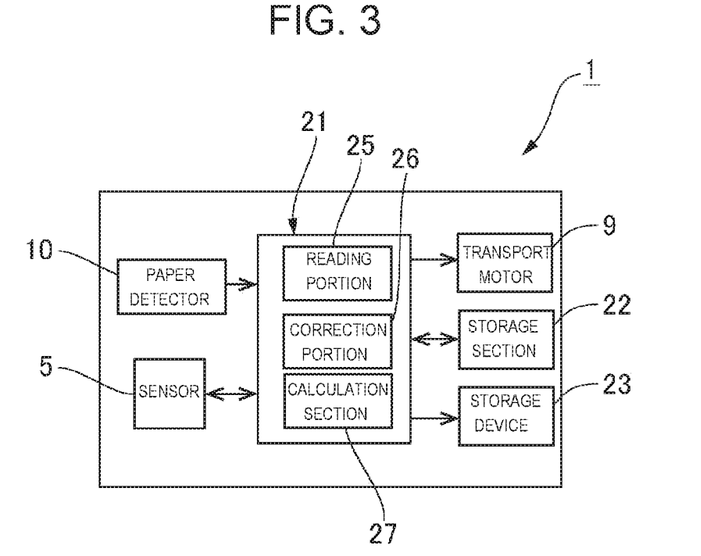
FIG. 3 is a schematic block diagram that shows a control system of the scanner.
Figure 4:
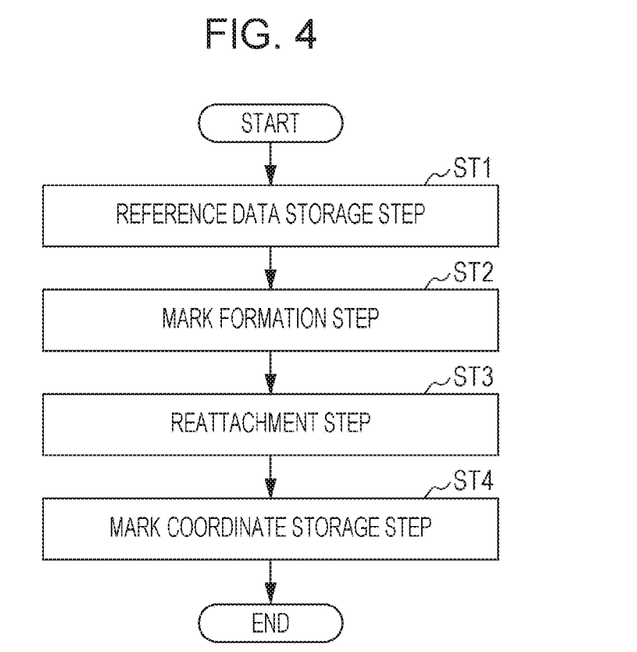
FIG. 4 is a flowchart of a method for manufacturing a scanner.

FIG. 3 is a schematic block diagram that shows a control system of the scanner. FIG. 4 is a flowchart of a method for manufacturing a scanner. The control system of the scanner 1 is configured centering around a control portion 21 that is provided with a controller (more specifically, realized by a CPU, an ASIC, a combination thereof, or the like), a ROM, a RAM, and the like. The image reading sensor 5, the transport motor 9, the paper detector 10, non-volatile memory 22 (a storage section), and a storage device 23 are connected to the control portion 21. The controller of the control portion 21 reads a program stored in the non-volatile memory 22, and the controller performs a process that includes the calculation of shading data and shading correction by controlling each portion of the scanner 1 using the ROM and the RAM on the basis of the read program.

Reference data X(x) for calculating shading data for shading correction is stored and maintained in the non-volatile memory 22. The reference data X(x) is stored and maintained in the non-volatile memory 22 in the step for manufacturing the scanner 1. The reference data X(x) is a value obtained by the white reference plate 15A in a state before the mark 16 is made being disposed at the reading position R in a position that faces the sensor surface with the transport pathway 6 interposed therebetween and the reference plate 15A being read by the image reading sensor 5. In addition, in the step for manufacturing the scanner 1, a position (a coordinate in the main scanning direction S) of the mark 16 made on the reference plate 15A is stored and maintained in the non-volatile memory 22. Additionally, the reference data X(x) and a program that operates the controller of the control portion 21 may be present inside the same physical non-volatile memory 22, or may be present inside different physical non-volatile memories.

That is, in the step for manufacturing the scanner 1, when the reference plate 15A and the sensor are disposed so that the reference plate 15A (a white rectangular plate in which the mark 16 has not been made) faces the sensor surface at the reading position R with the transport pathway 6 interposed therebetween, the work shown in FIG. 4 is performed. Firstly, a reference data storage step ST1 that stores the reference data X(x), which is a result of the reference plate 15A being read by the image reading sensor 5, in the non-volatile memory 22 is performed. In addition, in the step for manufacturing the scanner 1, after the reference data storage step ST1, a mark formation step ST2 in which the reference plate 15A is removed from the reading position R and the mark 16 is made on the reference plate 15A, and a reattachment step ST3 in which the marked reference plate 15, which is the reference plate 15A on which the mark 16 has been made, is reattached to the reading position R in a position that faces the sensor surface with the transport pathway 6 interposed therebetween.

Figure 5:
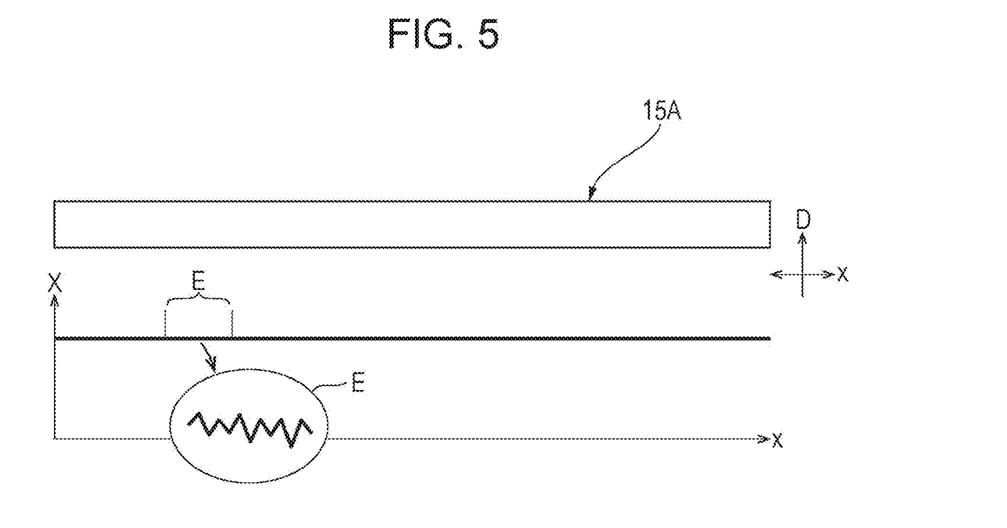
FIG. 5 is an explanatory view of a reference plate and reference data.

In this instance, the drawing at the top of FIG. 5 is a plan view of the reference plate 15A before the mark is made and the graph at the bottom of FIG. 5 is the reference data X(x) that is obtained as a result of the reference plate 15A being read by the image reading sensor 5. The horizontal axis of the graph at the bottom of FIG. 5 is a coordinate x in the main scanning direction S, and the vertical axis is the output from the image reading sensor 5. Additionally, in the graph at the bottom of FIG. 5, a graph that is surrounded by an ellipse is a partially enlarged graph in which a range E of the reference data X(x) is enlarged. The range E is a region that differs from a section in which the mark 16 is made. That is, microscopically, the reference data X(x) fluctuates in accordance with the coordinate x, but macroscopically, takes on a substantially constant value in which the coordinate x does not deviate.

Figure 6:
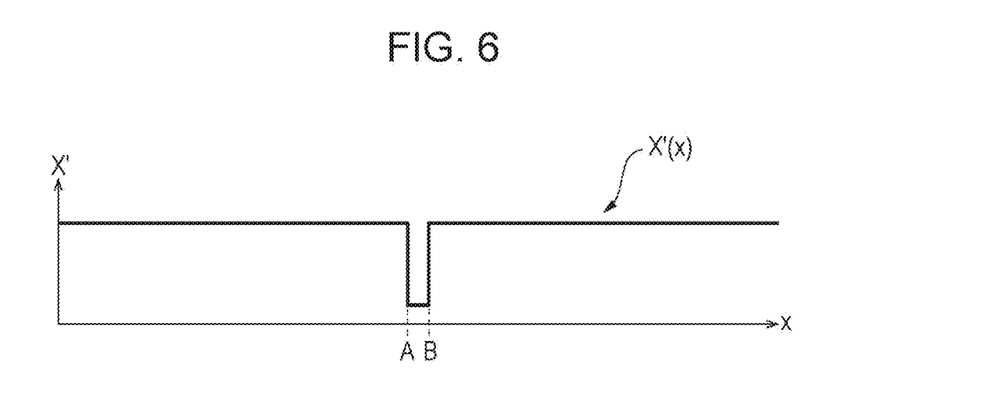
FIG. 6 is a graph of second reference data in which the marked reference plate is read.

Furthermore, in the step for manufacturing the scanner 1, as shown in FIG. 4, after the reattachment step ST3, a mark coordinate storage step ST4 in which the marked reference plate 15, which is attached to the reading position R, is read by the image reading sensor 5, a position (coordinates of a range of the mark 16 in the main scanning direction S) of the mark 16 is acquired from second reference data X'(x), which is read, and the coordinates are stored in the non-volatile memory 22, is performed. In this instance, FIG. 6 is a graph of the second reference data X'(x) in which the marked reference plate 15 is read by the image reading sensor 5 in the mark coordinate storage step ST4. The horizontal axis of the graph at the bottom of FIG. 6 is the coordinate x in the main scanning direction S, and the vertical axis is the output from the image reading sensor 5. As shown in FIG. 6, in the second reference data X'(x), the output of the position of the mark 16 is significantly lower than the output of regions other than the position of the mark 16. Accordingly, in the mark coordinate storage step ST4, coordinates (coordinate A-coordinate B) of a region in which the output is significantly low are acquired as the position of the mark 16 on the basis of the second reference data X'(x), and are stored in the non-volatile memory 22.

Next, as shown in FIG. 3, the control portion 21 is provided with a reading portion 25 that acquires read images by optically reading documents, and a correction portion 26 that performs shading correction of read images using shading data. In addition, the control portion 21 is provided with a calculation section 27 that calculates shading data to be used in shading correction.

When insertion of a document into the transport pathway 6 is detected by the paper detector 10, the reading portion 25 drives the transport motor 9 and causes the transport rollers 8 to rotate. As a result of this, the document is transported along the transport pathway 6. In addition, the reading portion 25 drives the image reading sensor 5 and radiates reading light from a light source. Further, the reading portion 25 acquires a read image on the basis of an output from each light receiving element in which reflected light of the reading light is received from a document that passes through the reading position R.

The correction portion 26 acquires a corrected image by performing shading correction on a read image by using shading data. That is, the correction portion 26 generates a corrected image in which the level of the brightness of each pixel of a read image is adjusted as a result of performing shading correction on a read image acquired by the reading portion 25. In addition, the correction portion 26 acquires a front end and a trailing end of a document in a corrected image from the position at which the document covers the mark 16, and cuts out a document section only from the corrected image. Further, the correction portion 26 stores and maintains a cut-out corrected image in the storage device 23 as a reading result of a document.

Additionally, the correction portion 26 may acquire a front end and a trailing end of a document in a read image from the position at which the document covers the mark 16, and cut out a document section only from the read image before performing shading correction of a read image. In this case, the correction portion 26 acquires a corrected image by carrying out shading correction on a cut-out read image, and stores and maintains the corrected image in the storage device 23 as a reading result of a document.

Figure 7:
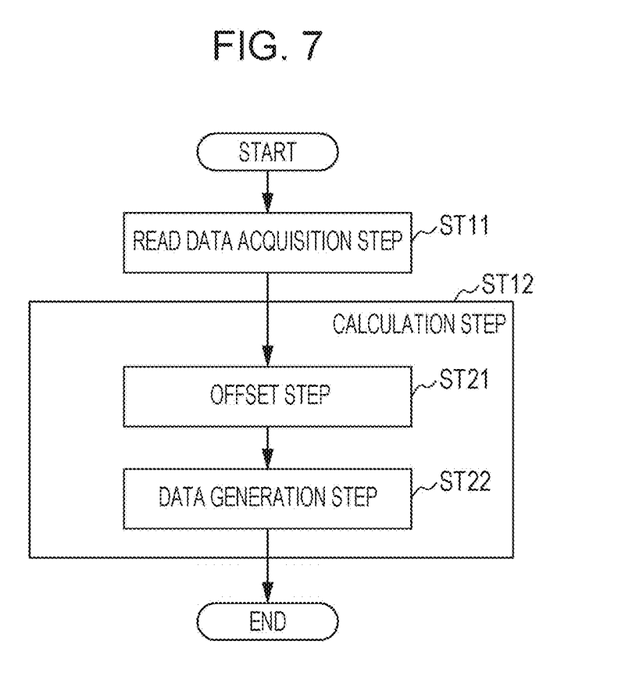
FIG. 7 is a flowchart of an acquisition operation of shading data.

The calculation section 27 acquires shading data at a predetermined timing that is set in advance before reading of a document is started, such as at a time at which an instruction for document reading is received by the scanner 1 or a time at which a power source is turned on. FIG. 7 is a flowchart of an acquisition operation of shading data.

Figure 8:
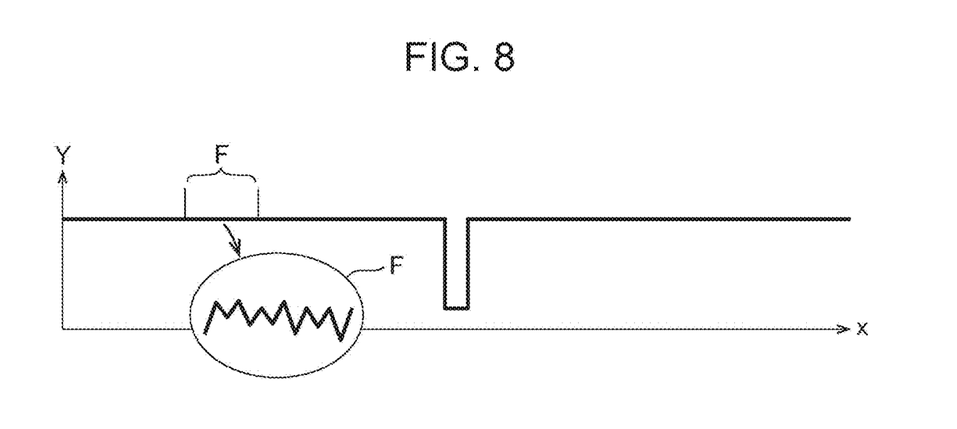
FIG. 8 is a graph of read data in which the marked reference plate is read.

As shown in FIG. 7, firstly, the calculation section 27 performs a read data acquisition step ST11 in which read data Y(x) is acquired as a result of the marked reference plate 15 being read by the image reading sensor 5 at a predetermined timing. FIG. 8 is a graph of the read data Y(x) in which the marked reference plate 15 is read by the image reading sensor 5 in the read data acquisition step ST11. The horizontal axis of the graph at the bottom of FIG. 8 is the coordinate x in the main scanning direction S, and the vertical axis is the output from the image reading sensor 5. Additionally, in FIG. 8, a graph that is surrounded by an ellipse is a partially enlarged graph in which a range F of the read data is enlarged. The range F is a region that differs from a section in which the mark 16 is made, and includes the range E in the main scanning direction S.

Figure 9:
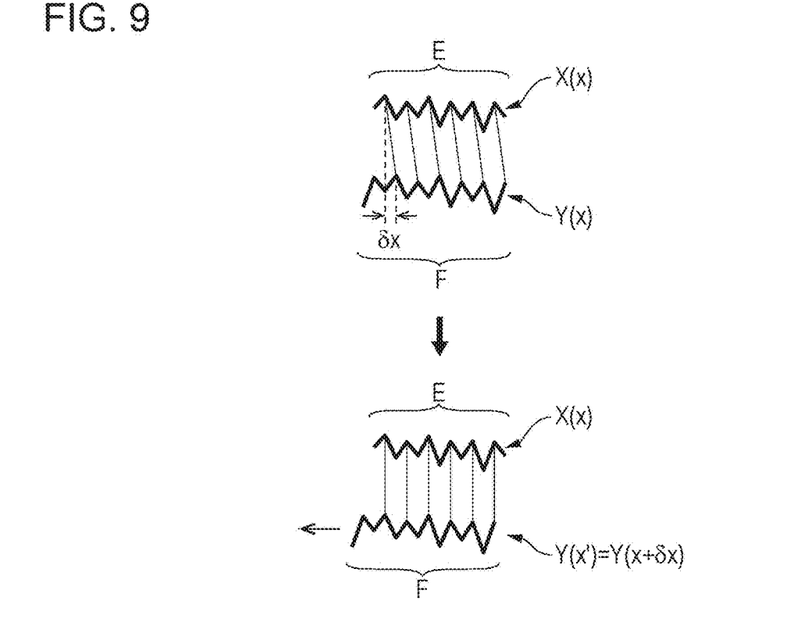
FIG. 9 is an explanatory view of an offsetting step that the calculation section performs.
Figure 10:
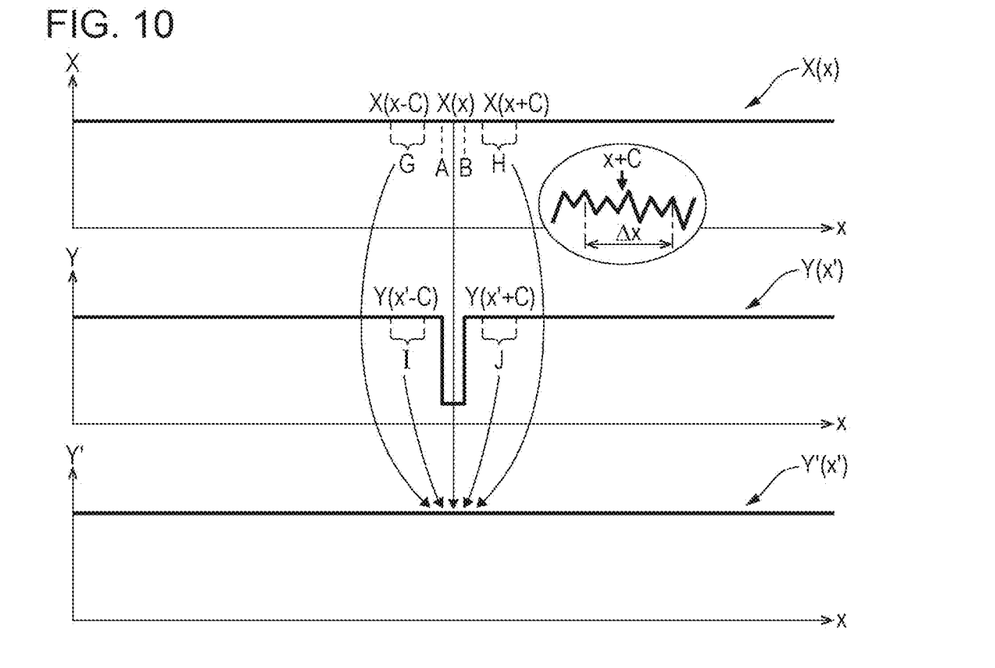
FIG. 10 is an explanatory view of a data generation step that the calculation section performs.

Next, the calculation section 27 performs a calculation step ST12 in which the acquired read data Y(x) and the reference data X(x) stored and maintained in the non-volatile memory 22 are compared, and shading data Y'(xi) is calculated. The calculation step ST12 is provided with an offsetting step ST21 in which the read data Y(x) is offset in the main scanning direction S, and a data generation step ST22 in which shading data Y'(x') is generated on the basis of the reference data X(x) and the post-offsetting read data Y(x'). FIG. 9 is an explanatory view of the offsetting step ST21. FIG. 10 is an explanatory view of the data generation step ST22.

In the offsetting step ST21, the phase of the read data Y(x) and the phase of the reference data X(x) are matched. That is, generally, in a plurality of lenses arranged in the main scanning direction S in the image reading sensor 5, there is variation in the amount of light transmitted to each lens. Accordingly, as shown by the partially enlarged graph of the reference data X(x) in the range E shown in FIG. 5 and the partially enlarged graph of the read data Y(x) of the range F shown in FIG. 8, the read data Y(x) and the reference data X(x) include phases (lens period irregularities) that correspond to the period at which the plurality of lenses are disposed. Meanwhile, in the scanner 1, there are cases in which an adhesive with which the plurality of lenses and the marked reference plate 15 are fixed expands or contracts due to the temperature of an installation location, or the like, and the relative position of the marked reference plate 15 and the plurality of lenses changes from that at the time of manufacture. In addition, there are cases in which the relative position of the marked reference plate 15 and the plurality of lenses changes from that at the time of manufacture due to vibrations generated during carriage or during installation of the scanner 1. Accordingly, as shown by the drawing on the upper side of FIG. 9, when the reference data X(x) is compared with the read data Y(x), there are cases in which there is a deviation between the phase of the reference data X(x), which is acquired during manufacture, and the phase of the read data Y(x), which is acquired during use.

In order to solve such a shift in phases, in the offsetting step, the phase of the reference data X(x) and the phase of regions other than the position (a range over which the mark 16 is formed) of the mark 16 in the read data Y(x) are compared, and the amount of shift δx of the phases is calculated. Further, as shown by the drawing on the lower side of FIG. 9, the read data Y(x) is offset in the main scanning direction S by the amount of shift δx, and the phase of the read data Y(x) and the phase of the reference data X(x) are matched. Conversely, the phase of the read data Y(x) and the phase of the reference data X(x) may be matched by offsetting the reference data X(x). In a case in which the read data Y(x) is offset, post-offsetting read data Y(x') is represented by offsetting (1) below.

$$Y(x')=Y(x+\delta x) \quad (1)$$

Next, in the data generation step ST22, the calculation section 27 configures unchanged post-offsetting read data Y(x') as the shading data Y'(x') for regions other than the position of the mark 16 (a range over which the mark 16 is formed). In addition, the calculation section 27 calculates the shading data Y'(x') for the position of the mark 16 on the basis of the reference data X(x) of the position of the mark 16, the reference data X(x) in the periphery of the mark 16, and the post-offsetting read data Y(x') in the periphery of the position of the mark 16.

More specifically, when coordinates that specify a range over which the mark 16 is formed in the main scanning direction S are defined as A and B, the reference data is defined as X(x), post-offsetting read data is defined as Y(x'), a predetermined distance f e position of the mark 16 is defined as C, and a predetermined width in the main scanning direction S is defined as Δx, the calculation section 27 calculates the shading data Y'(x') using formulae (2) and (3) below.

$$Y'(x')=Y(x')(x<A \text{ or } x>B) \quad (2)$$

$$Y'(x')=X(x)\times[\text{Average}\{Y(x'-C+\Delta x)\}+\text{Average}\{Y(x'+C+\Delta x)\}]/[\text{Average}\{X(x-C+\Delta x)\}+\text{Average}\{X(x+C+\Delta x)\}](A<x<B) \quad (3)$$

Formula (2) configures unchanged post-offsetting read data Y(x') as the shading data Y'(x') for regions other than the position of the mark 16.

Formula (3) is a formula for calculating the shading data Y'(x') of the position of the mark 16. Next, formula (3) will be described in detail with reference to FIG. 10. Firstly, the reference data X(x) learned in the step for manufacturing the scanner 1 is shown in the graph at the top of FIG. 10 (the graph at the bottom of FIG. 5). Since the reference data X(x) is a reading result of the white reference plate 15A in which the mark 16 is not made being read, even though the coordinate x changes, there is not a large amount of fluctuation in the value thereof.

Figure 11:
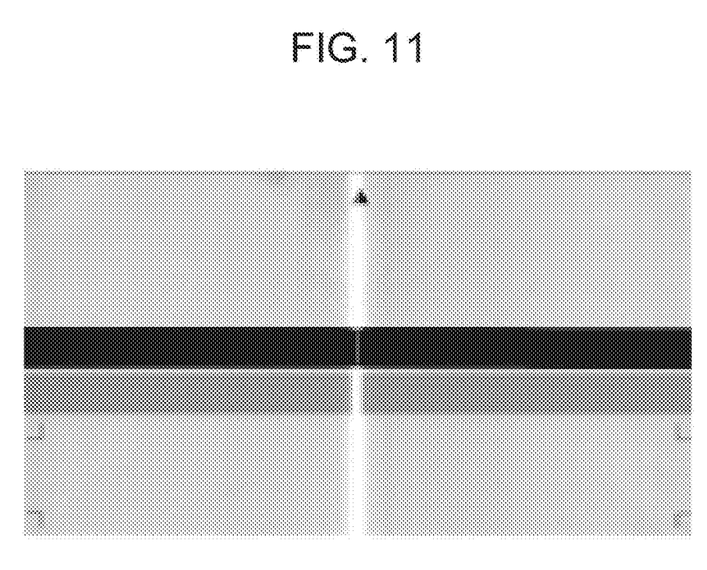
FIG. 11 is a corrected image in which shading correction has been performed on read data of the marked reference plate.

Meanwhile, the post-offsetting read data Y(x') is shown in the graph in the middle of FIG. 10. The value of the position of the mark 16 in the post-offsetting read data Y(x') is significantly lower than that of regions other than the position of the mark 16. In this instance, for example, when shading correction is performed using the unchanged post-offsetting read data Y(x') that is shown in the graph in the middle of FIG. 10 as the shading data Y'(x'), the pixels of a read image that correspond to the position of the mark 16 are overcorrected to be bright in comparison with regions other than the position of the mark 16. As a result of this, for example, in a case in which a document in which two bands of light and shade that extend in a direction that is orthogonal to the transport direction are printed midway through the transport direction is read by the scanner, as shown in FIG. 11, there is a problem in that a white band that is not in the actual document is formed in a corrected image after shading correction in a central portion (a position that corresponds to the position of the mark 16) of the document.

In such an instance, the calculation section 27 calculates the shading data Y'(x') of the position of the mark 16 on the basis of formula (3). More specifically, as shown by the graph at the top of FIG. 10, the calculation section 27 respectively calculates average values of the reference data X(x) in a range G and a range H, which are positions that are separated from the position of the mark 16 (coordinate A-coordinate B) by the predetermined distance C on one side and on the other side in the main scanning direction S, and which have the predetermined width Δx. Additionally, in the graph at the top of FIG. 10, a graph that is surrounded by an ellipse is a partially enlarged graph in which the range H of the reference data X(x) is enlarged. In addition, as shown by the graph in the middle of FIG. 10, the calculation section 27 respectively calculates average values of the post-offsetting read data Y(x') in a range I and a range J, which are positions that are separated from the position of the mark 16 by the predetermined distance C on one side and on the other side in the main scanning direction S, and which have the predetermined width Δx. Further, a ratio of a first total value obtained by summing the average value of the reference data X(x) in the range G and the average value of the reference data X(x) in the range H, and a second total value obtained by summing the average value of the post-offsetting read data Y(x') in the range I and the average value of the post-offsetting read data Y(x') in the range J is determined. Further, the calculation section 27 multiplies the obtained ratio by the reference data X(x) at the position of the mark 16, and configures the result as the shading data Y'(x') of the position of the mark 16. As a result of this, the shading data Y'(x') calculated by the calculation section 27 is shown in the graph at the bottom of FIG. 10.

In a case in which shading correction is performed using the shading data Y'(x') calculated on the basis of formula (3), the pixels of a read image that correspond to the position of the mark 16 are not overcorrected to be bright in comparison with regions other than the position of the mark 16. Accordingly, when a document similar to the case of FIG. 11 is read by the scanner, as shown in FIG. 12, a white band that is not in the actual document is not formed in a corrected image after shading correction in a central portion of the document.

Figure 12:
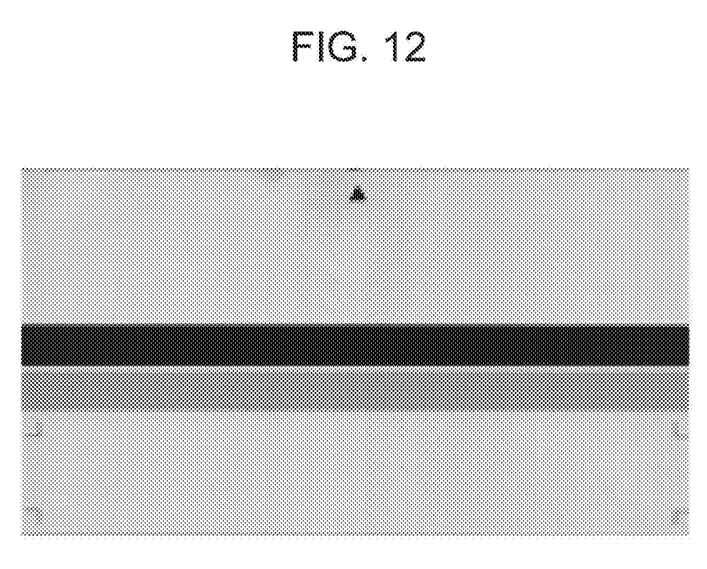
FIG. 12 is a corrected image in which shading correction has been performed in shading data of the present example.
Figure 13:
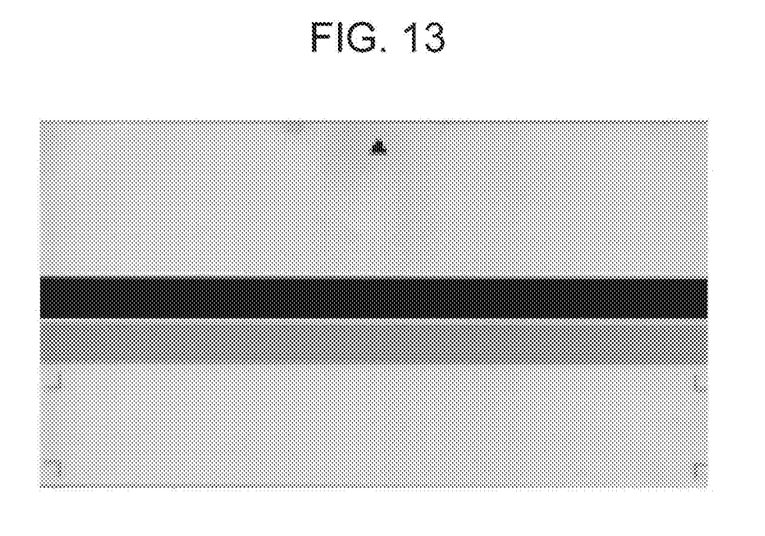
FIG. 13 is a corrected image in which shading correction has been performed in read data of the reference plate.

In this instance, FIG. 13 is an example of a corrected image in a case in which shading correction is performed using unchanged offset read data Y(x') obtained as a result of the reference plate 15A, which does not have the mark 16, being read by a scanner as the shading data Y'(x') in a scanner of the related art that is provided with the reference plate 15A. In FIG. 13, in a similar manner to the cases of FIG. 11 and FIG. 12, a document in which two bands of light and shade that extend in a direction that is orthogonal to the transport direction are printed midway through the transport direction is read.

According to the observations of the present inventors, in a case in which the corrected image of the scanner, which shown in FIG. 13, and a corrected image of the scanner 1 of the present example, which is shown in FIG. 12, are compared, the difference in the luminosity, and the like, of each pixel of the two corrected images is within the range of error. Accordingly, in a case in which the marked reference plate 15 is used, as a result of performing shading correction using the shading data Y'(x') calculated by the calculation section 27, it is also possible to favorably perform correction in a similar manner to a case in which read data obtained as a result of the reference plate 15A, in which the mark 16 is not made, being read, is used as the shading data.

Document Reading Operation

Figure 14:
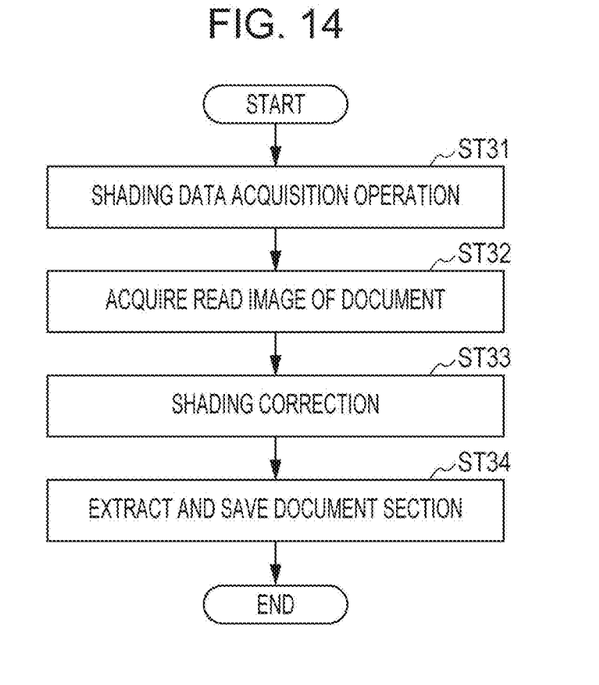
FIG. 14 is a flowchart of a document reading operation by the scanner.

Next, an example of a document reading operation in which the scanner 1 reads a document will be described with reference to FIG. 14. FIG. 14 is a flowchart of the document reading operation by the scanner 1. When the scanner 1 receives an instruction for document reading, the control portion 21 starts the document reading operation. In the document reading operation, firstly, the control portion 21 (the calculation section 27) performs an acquisition operation of shading data that is shown by FIG. 7 (Step ST31).

Thereafter, when insertion of a document into the transport pathway 6 is detected by the paper detector 10, the control portion 21 (the reading portion 25) drives the transport motor 9 and causes the transport rollers 8 to rotate. In addition, the control portion 21 drives the image reading sensor 5 and acquires a read image of the document that passes through the reading position R (Step ST32).

In this instance, when a read image is acquired, the control portion 21 (the correction portion 26) acquires a corrected image by performing shading correction of the read image by using the shading data Y'(x') (Step ST33). In addition, the control portion 21 (the correction portion 26) acquires a front end and a trailing end of the document in the corrected image from the position at which the document covers the mark 16, cuts out a document section only from the corrected image, and saves the cut-out corrected image in the storage device 23 as a reading result of the document (Step ST34).

According to the present example, shading correction for a read image is performed using the shading data Y'(x') calculated by the calculation section 27. Accordingly, in a case in which the marked reference plate 15 is used, it is also possible to favorably perform correction in a similar manner to a case in which read data obtained as a result of the reference plate 15A, in which the mark 16 is not made, being read, is used as the shading data.

In addition, in the present example, the mark 16 is provided on the marked reference plate 15 in a central portion of the reference plate 15A in the main scanning direction S, which intersects the transport direction D of a document. Accordingly, when a document is transported to the reading position R, it is possible to cover the mark 16 with the document. Therefore, it is possible to acquire a front end and a trailing end of a document in a read image or a corrected image from the position at which the document shields the mark 16. As a result of this, it is easy to cut out the document section only from a read image or a corrected image.

In this instance, in the present example, an example of white shading in which the shading data Y'(x') is acquired by reading the marked reference plate 15 in a state in which the reading light is radiated from the light source is shown, but in a case in which black shading, in which the shading data Y'(x') is acquired by reading the marked reference plate 15 without the reading light being radiated from the light source, it is also possible to acquire the shading data Y'(x') in a similar manner to the above-mentioned example irrespective of the presence or absence of radiation of the reading light.

Additionally, naturally, a second image reading sensor may be mounted in the scanner 1 of the present example, and a front surface and a rear surface of a document transported through the transport pathway 6 may be read. In this case, the second image reading sensor is disposed on the upstream side or the downstream side of the reading position R on a side opposite the image reading sensor 5 with the transport pathway 6 interposed therebetween. In addition, a second marked reference plate is disposed at a reading position of the second image reading sensor in a position that faces a sensor surface of the second image reading sensor with the transport pathway 6 interposed therebetween. Further, when shading correction is performed on a read image read by the second image reading sensor, rather than using unchanged read data obtained by the second marked reference plate being read by the second image reading sensor as shading data, shading data is calculated in a similar manner to the above-mentioned case.

That is, in the step for manufacturing the scanner, second reference data, which is a result of a second reference plate being read by the second image reading sensor in a state in which a mark is not made, is stored and maintained in the non-volatile memory 22. Thereafter, a mark is provided on the second reference plate, and is disposed in a position that faces the sensor surface of the second image reading sensor as a second marked reference plate. Further, before reading of a document is started, the second read data is acquired as a result of the second marked reference plate being read by the second image reading sensor, and the shading data is calculated by comparing the second read data and the second reference data. Additionally, a mark may be made on a reference plate that faces one image reading sensor only, and not made for the other.

In this instance, the image reading sensor 5 may be a CCD (Charge Coupled Device). In addition, in a case in which the invention is applied to a color scanner, reference data is stored for each color, and the above-mentioned process is performed for each color.

In addition, a scanner to which the invention is applied may be a dedicated scanning machine that performs scanning only, or may be a multifunction peripheral that is provided with a printing function, a FAX communication function, and the like, in addition to scanning.

What is claimed is:

1. A method for manufacturing a scanner in which a transported document is read by a sensor, the method comprising:
    storing reference data, which is a result of a reference plate for shading correction being read by the sensor before making a mark on the reference plate, in a storage section;
    forming a marked reference plate by making the mark on the reference plate; and
    installing a program that causes a controller to calculate shading data by comparing read data, which is a result of the marked reference plate being read by the sensor, and the reference data and offsetting at least one of the read data and the reference data, and to perform shading correction on a read image of the document read by the sensor on the basis of the shading data.

2. The method for manufacturing a scanner according to claim 1,
    wherein, in the forming, the mark is provided in a central portion of the reference plate in a main scanning direction, which intersects a transport direction of the document.

3. The method for manufacturing a scanner according to claim 1,
    wherein the program causes calculation of shading data of the position of the mark on the basis of the reference data of the position of the mark and read data in the periphery of the position of the mark.

4. The method for manufacturing a scanner according to claim 3,
    wherein, when a coordinate in a main scanning direction, which intersects a transport direction of the document, is defined as x, values of the coordinate x that specify a range over which the mark is formed in the main scanning direction are defined as A and B, the reference data in the coordinate x is defined as X(x), the read data at in coordinate x is defined as Y(x), the amount of shift of the reference data X(x) and the read data Y(x) in a phase in the main scanning direction is defined as δx, a coordinate at which the coordinate x is offset by the amount of shift δx is defined as x', post-offsetting read data in which the read data Y(x) is offset by the amount of shift δx is defined as Y(x'), a predetermined distance in the main scanning direction is defined as C, a predetermined width in the main scanning direction is defined as Δx, and shading data in the coordinate x' is defined as Y'(x'), the program calculates the shading data Y'(x) using formulae (1), (2), and (3) below:

$$Y(x')=Y(x+\delta x) \quad (1)$$

$$Y'(x')=Y(x')(x<A \text{ or } x>B) \quad (2)$$

$$Y'(x')=X(x)\times[\text{Average}\{Y(x'-C+\Delta x)\}+\text{Average}\{Y(x'+C+\Delta x)\}]/[\text{Average}\{X(x-C+\Delta x)\}+\text{Average}\{X(x+C+\Delta x)\}](A<x<B) \quad (3).$$

5. A method for manufacturing a scanner in which a transported document is read by a sensor, the method comprising:
   storing reference data, which is a result of a reference plate for shading correction being read by the sensor, in a storage section;
   forming a marked reference plate by making a mark on the reference plate; and
   installing a program that causes a controller to calculate shading data by comparing read data, which is a result of the marked reference plate being read by the sensor, and the reference data, and to perform shading correction on a read image of the document read by the sensor on the basis of the shading data,
   wherein the program causes calculation of shading data of the position of the mark on the basis of the reference data of the position of the mark and read data in the periphery of the position of the mark.

* * * * *